(12) United States Patent
Eshima

(10) Patent No.: US 12,062,147 B2
(45) Date of Patent: Aug. 13, 2024

(54) INFORMATION PROCESSING SYSTEM AND INFORMATION PROCESSING METHOD

(71) Applicant: SONY GROUP CORPORATION, Tokyo (JP)

(72) Inventor: Masashi Eshima, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/756,788

(22) PCT Filed: Dec. 1, 2020

(86) PCT No.: PCT/JP2020/044697
§ 371 (c)(1),
(2) Date: Jun. 2, 2022

(87) PCT Pub. No.: WO2021/117552
PCT Pub. Date: Jun. 17, 2021

(65) Prior Publication Data
US 2022/0366661 A1   Nov. 17, 2022

(30) Foreign Application Priority Data
Dec. 10, 2019 (JP) .................................. 2019-223185

(51) Int. Cl.
*G06T 19/20* (2011.01)
*G06T 7/246* (2017.01)
*G06T 17/05* (2011.01)

(52) U.S. Cl.
CPC .............. *G06T 19/20* (2013.01); *G06T 7/246* (2017.01); *G06T 17/05* (2013.01);
(Continued)

(58) Field of Classification Search
CPC ......... G06T 19/20; G06T 7/246; G06T 17/05; G06T 2207/10016; G06T 2207/30241;
(Continued)

(56) References Cited

U.S. PATENT DOCUMENTS

2010/0287485 A1   11/2010   Bertolami et al.
2022/0093020 A1*   3/2022   Kamiya ................ G02B 27/01

FOREIGN PATENT DOCUMENTS

JP   2013-182523 A   9/2013
JP   2014-197317 A   10/2014
(Continued)

OTHER PUBLICATIONS

Kudo, et al., "A survey of the robustness of image features in different light source environments", Information Processing Society of Japan, Technical Reports: Computer Vision and Image Media(CVIM), Jan. 15, 2015 [online].
(Continued)

*Primary Examiner* — Chong Wu
(74) *Attorney, Agent, or Firm* — CHIP LAW GROUP

(57) ABSTRACT

An information processing system includes an estimation unit that, when map information indicating a map of an environment around a first device in a real space is updated, estimates a position of the first device, based on observation information obtained by observing the environment around the first device and the map information after update, an identification unit that identifies a position of a virtual camera provided in a virtual space associated with the real space, based on the position of the first device estimated by the estimation unit, and a video generation unit that generates a video of the virtual space corresponding to an imaging range of the camera at the position identified by the identification unit.

18 Claims, 9 Drawing Sheets

(52) U.S. Cl.
CPC .............. *G06T 2207/10016* (2013.01); *G06T 2207/30241* (2013.01); *G06T 2210/56* (2013.01); *G06T 2219/2016* (2013.01)

(58) Field of Classification Search
CPC ......... G06T 2210/56; G06T 2219/2016; G06T 19/003; G06T 2207/30244; G06T 7/75
See application file for complete search history.

(56) References Cited

FOREIGN PATENT DOCUMENTS

| | | |
|---|---|---|
| JP | 2019-003280 A | 1/2019 |
| WO | 2017/168899 A1 | 10/2017 |
| WO | 2018/185972 A1 | 10/2018 |
| WO | 2018/207426 A1 | 11/2018 |

OTHER PUBLICATIONS

International Search Report and Written Opinion of PCT Application No. PCT/JP2020/044697, issued on Feb. 16, 2021, 11 pages of ISRWO.

\* cited by examiner

INFORMATION PROCESSING SYSTEM AND INFORMATION PROCESSING METHOD

CROSS REFERENCE TO RELATED APPLICATIONS

This application is a U.S. National Phase of International Patent Application No. PCT/JP2020/044697 filed on Dec. 1, 2020, which claims priority benefit of Japanese Patent Application No. JP 2019-223185 filed in the Japan Patent Office on Dec. 10, 2019. Each of the above-referenced applications is hereby incorporated herein by reference in its entirety.

FIELD

The present disclosure relates to an information processing system, an information processing method, and a program.

BACKGROUND

Three-dimensional video using three-dimensional image data such as computer graphics (CG) has been widely used. For such a three-dimensional video, a three-dimensional video having good camerawork and appearing as if to be taken by a camera operator has been demanded. However, in the three-dimensional video, it is difficult to show the video appearing as if the video was taken by the camera operator because it is necessary to generate three-dimensional translation and rotation information.

Here, a technology has been developed to generate a three-dimensional video showing the inside of a virtual space appearing as if to be taken by a virtual camera that is an imaginary camera and is arranged in the virtual space created by three-dimensional image data. Such a virtual camera makes it possible to generate a three-dimensional video having highly realistic camerawork by using a device serving as the virtual camera, held by the camera operator, and a self-position estimation technology.

CITATION LIST

Patent Literature

Patent Literature 1: JP 2014-197317 A

SUMMARY

Technical Problem

However, in the self-position estimation technology, update of map information may generate an unexpected three-dimensional video due to an error included in map information before the update.

Therefore, the present disclosure proposes an information processing system, an information processing method, and a program that are configured to solve the problem caused by an error in map information when the map information is updated.

Solution to Problem

To solve the problems described above, an information processing system according to the present disclosure includes: an estimation unit that, when map information indicating a map of an environment around a first device in a real space is updated, estimates a position of the first device, based on observation information obtained by observing the environment around the first device and the map information after update; an identification unit that identifies a position of a virtual camera provided in a virtual space associated with the real space, based on the position of the first device estimated by the estimation unit; and a video generation unit that generates a video of the virtual space corresponding to an imaging range of the camera at the position identified by the identification unit.

DESCRIPTION OF EMBODIMENTS

Figure 1:
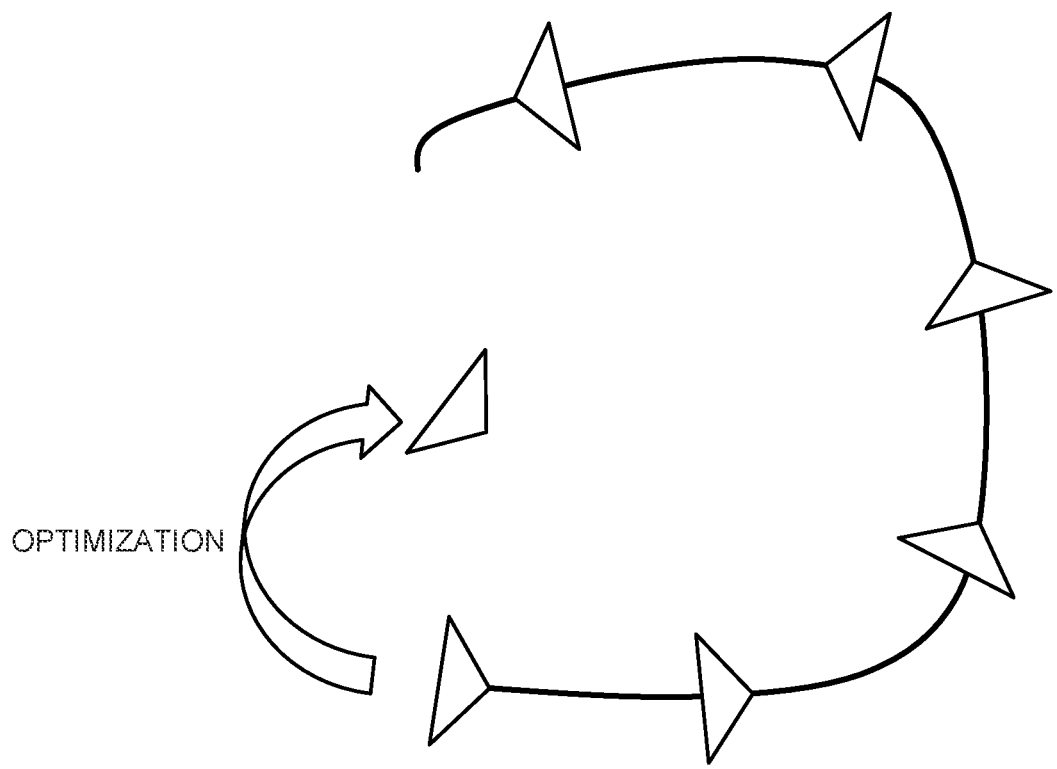
FIG. 1 is a diagram illustrating an example of a discontinuous result of self-position estimation due to optimization of map information.

The embodiments of the present disclosure will be described in detail below with reference to the drawings. Note that in the following embodiments, the same portions are denoted by the same reference numerals or symbols, and a repetitive description thereof will be omitted.

First Embodiment

Recent movies and the like often use three-dimensional videos using three-dimensional image data such as computer graphics (CG). For such a three-dimensional video, a three-dimensional video having good camerawork and appearing as if to be taken by a camera operator has been demanded. However, in order to generate the three-dimensional video having good camerawork and appearing as if to be taken by a camera operator, it is necessary to generate three-dimensional translation and rotation information at all times.

Therefore, it is very difficult to generate a video appearing as if to be taken by an actual camera operator.

Meanwhile, a technology has been developed to generate a three-dimensional video showing the inside of a virtual space appearing as if to be taken by a virtual camera that is an imaginary camera and is arranged in the virtual space created by three-dimensional image data.

In a virtual camera system, rendering of the virtual space within an imaging range of the virtual camera makes it possible to generate the three-dimensional video showing the inside of the virtual space appearing as if to be taken by the camera. Furthermore, in the virtual camera system, the camera operator holds and operates the device serving as the virtual camera, enabling generation of the three-dimensional video having highly realistic camerawork.

Here, "Unreal Engine Virtual Camera Plugin" is known as a technology of generating the three-dimensional video of the virtual space from a three-dimensional position and an attitude of the device.

These technologies are implemented using a Motion Capture system that detects device motion. For example, a so-called Outside-in method is used for the implementation, in which the three-dimensional position and attitude of the device are recognized by using a sensor or camera installed in an imaging environment in advance. However, in the Outside-in method, a self-position and an attitude of the device cannot be recognized outside the imaging environment in which the sensor, camera, and the like are installed. Therefore, performance of imaging is limited to the inside of the imaging environment.

Therefore, advance to a so-called Inside-out method that does not limit the imaging environment is expected. In the Inside-out method, a sensor or camera for recognizing the self-position and the attitude is mounted to the device. As described above, in the Inside-out method, the sensor or the camera mounted to the device prevents limitation of the imaging environment.

However, in order to estimate the position and attitude of the camera in a wide range without an error, it is generally necessary to create map information indicating the environment around the device in advance. The creation of the map information corresponding to every imaging position requires a long time and effort, leading to an increase in a time for imaging and cost.

Meanwhile, such a problem can be solved by creating the map information upon actual imaging or upon rehearsal, but there may be a case where update of the map information is required due to a difference in environment between the rehearsal and the actual imaging. In addition, the map information is not immediately optimized, but collectively optimized using the past recognition results. Therefore, when the creation and update of the map are performed upon imaging, there is a possibility that discontinuous result of self-position estimation may be provided due to optimization processing for the map information. Alternatively, there is a possibility that a movement trajectory of the device including an accumulated error may be output upon imaging.

Here, FIG. 1 is a diagram illustrating an example of the discontinuous result of self-position estimation due to optimization of the map information. Assuming that the vehicle initially moves as indicated by the trajectory illustrated in FIG. 1. Here, in a self-position estimation technology, the self-position is estimated, on the basis of image data obtained by imaging the surrounding environment and the map information indicating the surrounding environment.

Therefore, when the optimization processing is performed on the map information, the self-position may change as illustrated in FIG. 1. The change of the self-position also changes the imaging range of the virtual camera, and thus, there is a possibility that a discontinuous video may be generated. In addition, due to the error included in the map information before the update, the camera operator moving while viewing the three-dimensional video on the virtual camera may move along a route that is different from an expected route, as illustrated in FIG. 1. Accordingly, the time for imaging may be greatly different from that initially expected, in some cases. Therefore, there is a demand for a technology with which the problem caused by the error when the map information is updated by the optimization processing or the like can be eliminated.

Here, in a case where imaging is performed in a photo studio or the like, a range in which the camera operator is allowed to move is limited. Furthermore, the camera operator moves along a predetermined moving route in order to take a video of a desired imaging target.

When the map information is not updated by the optimization processing or the like, it is considered that the map information has an error. Therefore, even if the camera operator moves along the predetermined route, the desired imaging target may not be shown on a display displaying the virtual space. In the first embodiment, assuming that even when the desired imaging target is not shown on the display, the camera operator moves along the predetermined route.

Figure 2:
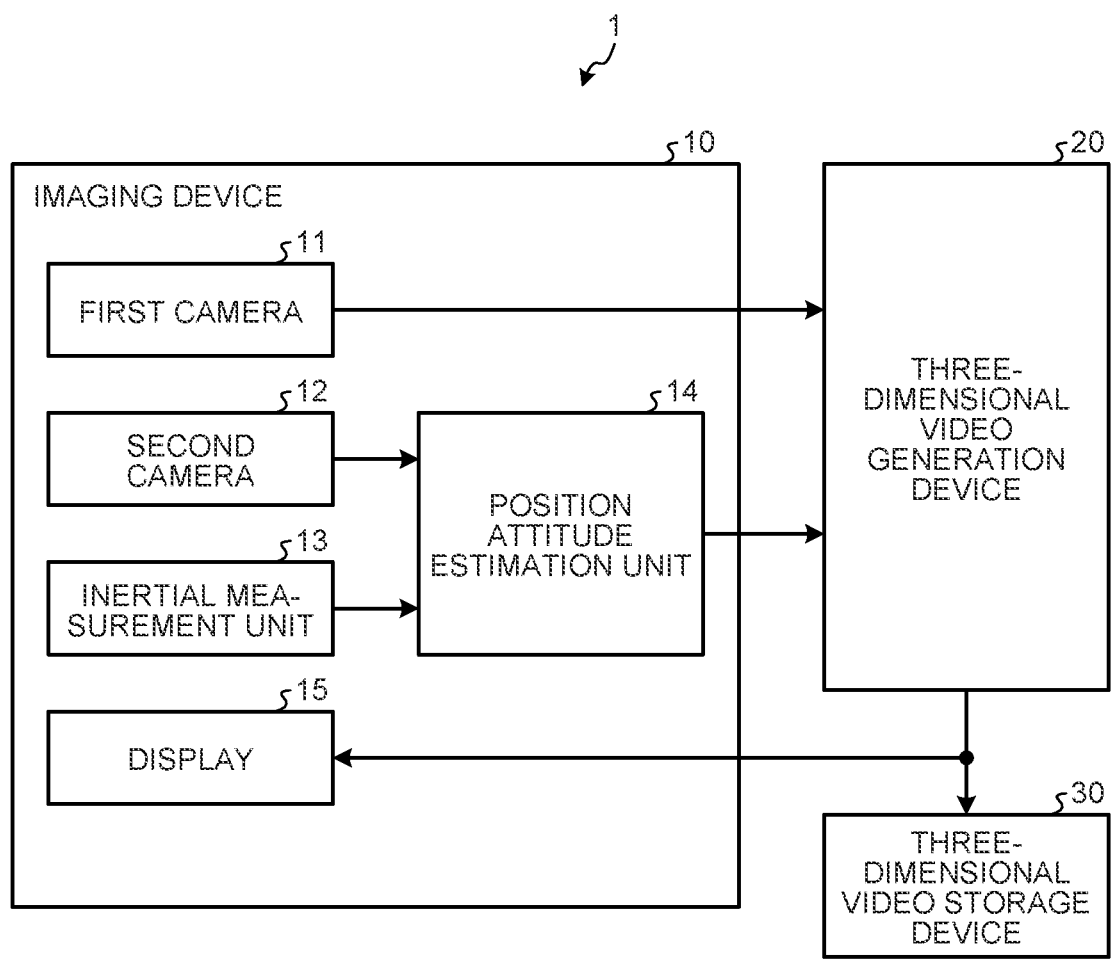
FIG. 2 is a diagram illustrating a configuration example of an information processing system according to a first embodiment of the present disclosure.

FIG. 2 is a diagram illustrating a configuration example of an information processing system 1 according to the first embodiment of the present disclosure. The information processing system 1 includes an imaging device 10, a three-dimensional video generation device 20, and a three-dimensional video storage device 30.

The imaging device 10 estimates the self-position and attitude estimated by Simultaneous Localization and Mapping (SLAM). The imaging device 10 is a device that identifies a region where the three-dimensional video is generated in the virtual space, on the basis of a result of the estimation. In other words, the imaging device 10 is a device that identifies the imaging range of the virtual camera in the virtual space.

The imaging device 10 includes a first camera 11, a second camera 12, an inertial measurement unit (IMU) 13, a position attitude estimation unit 14, and a display 15.

The first camera 11 is a camera that images an object in a real space. The imaging device 10 images the object in the real space to generate the three-dimensional video in which the imaged object in the real space is superimposed. The first camera 11 generates a first camera image that is image data captured by the first camera 11. Note that the imaging device 10 may not include the first camera 11 when it is not necessary to image the object in the real space.

The second camera 12 is a camera that captures an image used for estimation of the self-position, the attitude, and the like of the imaging device 10. The second camera 12 generates a second camera image that is image data captured by the second camera 12.

The inertial measurement unit 13 is a device that includes various sensors measuring a motion state of the imaging device 10. For example, the inertial measurement unit 13 measures angular velocity, acceleration, and the like. Then, the inertial measurement unit 13 generates IMU information including the angular velocity, the acceleration, and the like.

The position attitude estimation unit 14 estimates the self-position and attitude of the imaging device 10, on the basis of the map information indicating the surrounding environment of the imaging device 10, the second camera image, and the IMU information. The self-position is information indicating a horizontal position and a vertical position of the imaging device 10. The attitude is information indicating the inclination of the imaging device 10 represented by a yaw angle, a roll angle, and a pitch angle. Then, the position attitude estimation unit 14 generates position attitude information indicating the position and attitude of the imaging device 10. Note that the position attitude estimation unit 14 may recognize the position and attitude of the imaging device 10 in the virtual space, on the basis of a movement distance, a direction thereof, and the like.

The display 15 displays the three-dimensional video of the virtual space included in the imaging range of the virtual camera. In other words, the display 15 displays the three-dimensional video generated by the three-dimensional video generation device 20. Therefore, the camera operator can grasp whether he/she is taking a video of which position in the virtual space.

The three-dimensional video generation device 20 generates the three-dimensional video of the virtual space corresponding to the imaging range of the virtual camera provided in the virtual space, on the basis of the position attitude information output from the imaging device 10. Then, the three-dimensional video generation device 20 transmits the generated three-dimensional video to the imaging device 10 and the three-dimensional video storage device 30.

The three-dimensional video storage device 30 stores the three-dimensional video generated by the three-dimensional video generation device 20.

Figure 3:
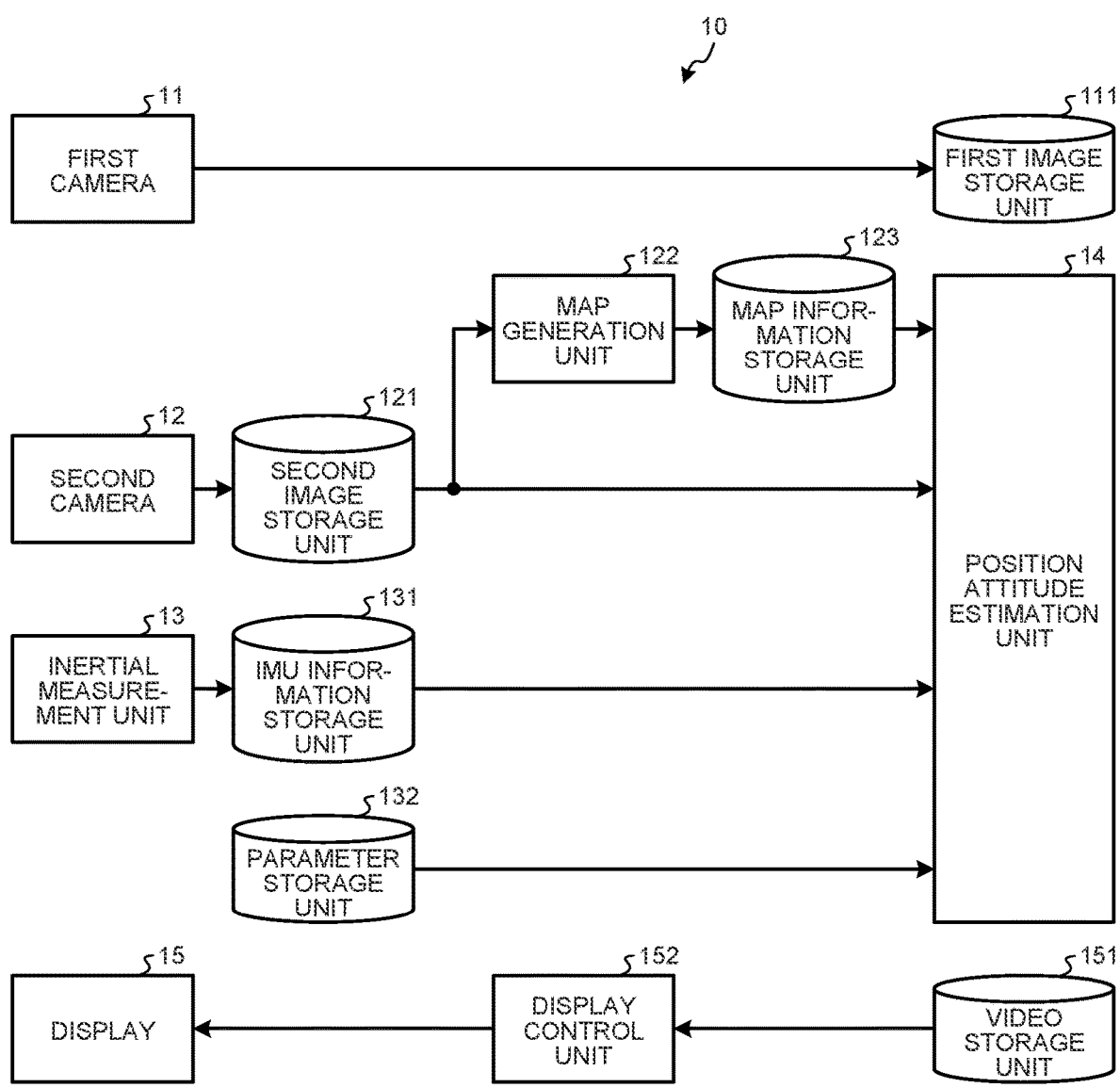
FIG. 3 is a diagram illustrating a schematic configuration example of an imaging device according to the first embodiment of the present disclosure.

Next, a schematic configuration of each device of the information processing system 1 according to the first embodiment will be described. Here, FIG. 3 is a diagram illustrating an example of a schematic configuration of the imaging device 10 according to the first embodiment of the present disclosure.

A first image storage unit 111 is a storage unit that stores the first camera image captured by the first camera 11. Then, the first image storage unit 111 transmits the first camera image to the three-dimensional video generation device 20.

A second image storage unit 121 is a storage unit that stores the second camera image captured by the second camera 12.

An IMU information storage unit 131 stores the IMU information generated by the inertial measurement unit 13.

A parameter storage unit 132 stores parameter information such as parameter values indicating settings of the second camera 12 and the inertial measurement unit 13. For example, the setting of the second camera 12 includes a setting related to the imaging range such as an angle of view. The setting of the inertial measurement unit 13 includes information such as noise of the inertial measurement unit 13 and a position where the inertial measurement unit 13 is mounted.

A map generation unit 122 generates the map information indicating the environment around the imaging device 10, on the basis of the second camera image. The map information is information used for SLAM. Then, the map generation unit 122 causes a map information storage unit 123 to store the generated map information. In addition, the map generation unit 122 appropriately performs update such as optimization processing on the map information stored in the map information storage unit 123. Note that the map generation unit 122 may generate the map information on the basis of not only the second camera image but also the second camera image and the IMU information, or may generate the map information on the basis of other information.

The position attitude estimation unit 14 estimates the position and attitude of the imaging device 10 in the real space, on the basis of the map information, the second camera image, the IMU information, and the parameter information. More specifically, the position attitude estimation unit 14 generates an image feature amount indicating feature points included in the second camera image. Then, the position attitude estimation unit 14 estimates the self-position by comparing the map information with the image feature amount. In addition, the position attitude estimation unit 14 generates measurement information indicating a result of measurement by the imaging device 10, on the basis of the IMU information and the parameter information. Then, the position attitude estimation unit 14 estimates the self-position and the attitude on the basis of the measurement information. In this way, the position attitude estimation unit 14 estimates the self-position and the attitude on the basis of the map information, the image feature amount, and the measurement information.

In a case where the self-position and the attitude are estimated, the position attitude estimation unit 14 generates the position attitude information indicating the position and attitude of the imaging device 10. Then, the position attitude estimation unit 14 transmits the position attitude information to the three-dimensional video generation device 20. Furthermore, the position attitude estimation unit 14 transmits the map information used for estimation of the self-position and the attitude, to the three-dimensional video generation device 20.

Furthermore, the position attitude estimation unit 14 transmits observation information obtained by observing the environment around the imaging device 10 in the real space, to the three-dimensional video generation device 20. The observation information includes at least one of the image feature amount and the measurement information. Furthermore, the position attitude estimation unit 14 may separately transmit the image feature amount and the measurement information to the three-dimensional video generation device 20. Furthermore, the position attitude estimation unit 14 may transmit the observation information including at least either the second camera image or the IMU information, instead of the image feature amount and the measurement information.

When receiving the three-dimensional video from the three-dimensional video generation device 20, a video storage unit 151 stores the three-dimensional video. A display control unit 152 causes the display 15 to display the three-dimensional video stored in the video storage unit 151.

Figure 4:
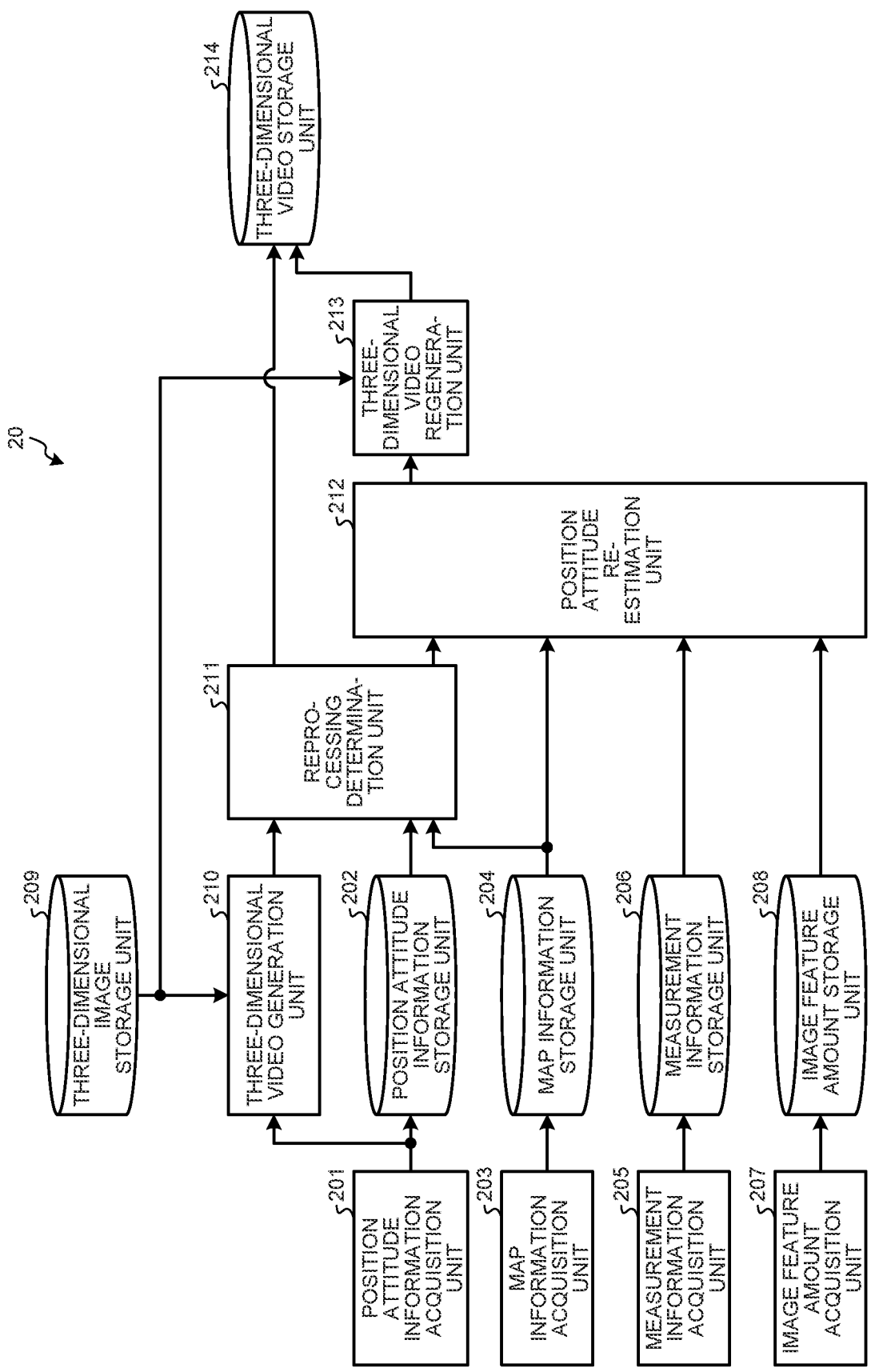
FIG. 4 is a diagram illustrating a schematic configuration example of a three-dimensional video composition device according to the first embodiment of the present disclosure.

Here, FIG. 4 is a diagram illustrating an example of a schematic configuration of the three-dimensional video generation device 20 according to the first embodiment of the present disclosure.

A position attitude information acquisition unit 201 acquires the position attitude information transmitted by the imaging device 10. The position attitude information acquisition unit 201 causes a position attitude information storage unit 202 to store the acquired position attitude information. The position attitude information storage unit 202 accumulates the position attitude information acquired by the position attitude information acquisition unit 201.

A map information acquisition unit 203 acquires the map information transmitted by the imaging device 10. The map information acquisition unit 203 causes a map information storage unit 204 to store the acquired map information. The map information storage unit 204 accumulates the map information acquired by the map information acquisition unit 203.

A measurement information acquisition unit 205 and an image feature amount acquisition unit 207 acquire the observation information obtained by observing the environment around the imaging device 10 in the real space. Then, the measurement information acquisition unit 205 and the image feature amount acquisition unit 207 accumulate the observation information in storage units. Here, the observation information includes at least one of the image feature amount and the measurement information. The measurement information acquisition unit 205 acquires the measurement information included in the observation information, from the imaging device 10. The measurement information acquisition unit 205 causes a measurement information storage unit 206 to store the acquired measurement information. The measurement information storage unit 206 accumulates the measurement information acquired by the measurement information acquisition unit 205.

The image feature amount acquisition unit 207 acquires the image feature amount included in the observation information, from the imaging device 10. The image feature amount acquisition unit 207 causes an image feature amount storage unit 208 to store the acquired image feature amount. The image feature amount storage unit 208 accumulates the image feature amounts acquired by the image feature amount acquisition unit 207.

A three-dimensional image storage unit 209 stores the three-dimensional image data constituting the virtual space. The three-dimensional image data may include point group data, such as point cloud, and further include a polygon mesh, texture, volumetric data that is obtained by replacing a space with three-dimensional data, and other data.

A three-dimensional video generation unit 210 generates the three-dimensional video of the virtual space, on the basis of the position and attitude of the imaging device 10 that is indicated by the position attitude information output from the position attitude information acquisition unit 201, and the three-dimensional image data that is stored in the three-dimensional image storage unit 209. More specifically, the three-dimensional video generation unit 210 identifies the position and attitude of the virtual camera provided in the virtual space associated with the real space, on the basis of the position and attitude of the imaging device 10 indicated by the position attitude information. Then, the three-dimensional video generation unit 210 generates the three-dimensional video of the virtual space corresponding to the imaging range of the virtual camera located at the identified position.

A reprocessing determination unit 211 determines whether to cause a position attitude re-estimation unit 212 to estimate the position of the imaging device 10, on the basis of the map information after the update. In other words, the reprocessing determination unit 211 determines whether to identify the position and attitude of the virtual camera by estimating the position and attitude of the imaging device 10 on the basis of the map information after the update. Then, the reprocessing determination unit 211 determines whether to regenerate the three-dimensional video of the virtual space included in the imaging range of the virtual camera, on the basis of a result of the re-estimation. For example, the reprocessing determination unit 211 makes a determination on the basis of a flag indicating whether the map information has been updated by the optimization processing or the like.

When it is determined not to re-estimate the position and attitude of the imaging device 10, the reprocessing determination unit 211 causes a three-dimensional video storage unit 214 to store the three-dimensional video generated by the three-dimensional video generation unit 210. On the other hand, when it is determined to re-estimate the position and attitude of the imaging device 10, the reprocessing determination unit 211 does not cause the three-dimensional video storage unit 214 to store the three-dimensional video. Furthermore, the reprocessing determination unit 211 requests the position attitude re-estimation unit 212 and a three-dimensional video regeneration unit 213 to perform reprocessing.

When the map information indicating a map of the environment around the imaging device 10 is updated, the position attitude re-estimation unit 212 estimates the position of the imaging device 10, on the basis of the observation information accumulated in the measurement information storage unit 206 and the image feature amount storage unit 208, and the map information after the update. In other words, the position attitude re-estimation unit 212 re-estimates the position and attitude of the imaging device 10, on the basis of the map information after the update, the measurement information, and the image feature amount. More specifically, the position attitude re-estimation unit 212 estimates the position and attitude of the imaging device 10, on the basis of the map information after the update, the measurement information accumulated in the measurement information storage unit 206, and the image feature amount accumulated in the image feature amount storage unit 208. Then, the position attitude re-estimation unit 212 outputs updated position attitude information that indicates the position and attitude of the imaging device 10 in the map information after the update.

The three-dimensional video regeneration unit 213 identifies the position of the virtual camera provided in the virtual space associated with the real space, on the basis of the position of the imaging device 10 estimated by the position attitude re-estimation unit 212. Then, the three-dimensional video regeneration unit 213 generates the three-dimensional video of the virtual space corresponding to the imaging range of the virtual camera located at the identified position. More specifically, the three-dimensional video regeneration unit 213 identifies the position and attitude of the virtual camera provided in the virtual space associated with the real space, on the basis of the position and attitude of the imaging device 10 indicated by the updated position attitude information. The three-dimensional video regeneration unit 213 generates the three-dimensional video of the virtual space corresponding to the imaging range of the virtual camera located at the identified position. Then, the three-dimensional video regeneration unit 213 causes the three-dimensional video storage unit 214 to store the generated three-dimensional video.

Furthermore, when the virtual camera moves with the movement of the imaging device 10 by the camera operator, the three-dimensional video regeneration unit 213 identifies the trajectory in the virtual space where the virtual camera has moved, on the basis of the position of the imaging device 10 estimated by the position attitude re-estimation unit 212. Then, the three-dimensional video regeneration unit 213 generates the three-dimensional video of the virtual space corresponding to the imaging range of the virtual camera having moved along the identified trajectory.

The three-dimensional video storage unit 214 stores the three-dimensional video generated by the three-dimensional video generation unit 210 or the three-dimensional video regeneration unit 213. Furthermore, the three-dimensional video storage unit 214 outputs the three-dimensional video of the virtual space corresponding to the imaging range of the virtual camera. For example, the three-dimensional video storage unit 214 transmits the three-dimensional video to the imaging device 10 and the three-dimensional video storage device 30.

Figure 5:
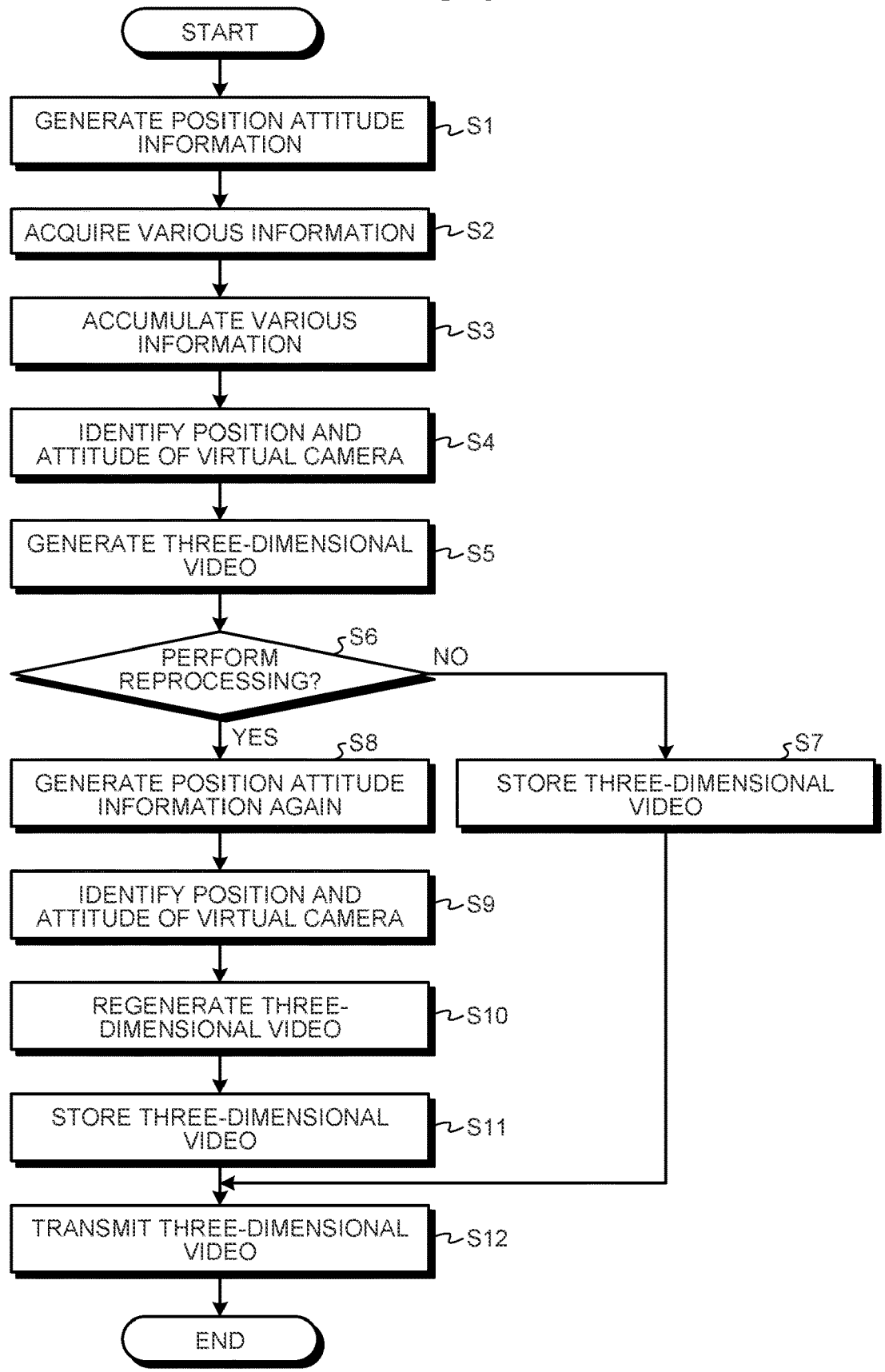
FIG. 5 is a flowchart illustrating an example of a three-dimensional video generation process according to the first embodiment of the present disclosure.

Next, a three-dimensional video generation process that is performed by the information processing system 1 according to the first embodiment will be described. FIG. 5 is a flowchart illustrating an example of the three-dimensional video generation process according to the first embodiment of the present disclosure.

The position attitude estimation unit 14 of the imaging device 10 generates the position attitude information indicating the position and attitude of the imaging device 10 (Step S1).

The three-dimensional video generation device 20 acquires various information output from the imaging device 10 (Step S2). In other words, the position attitude information acquisition unit 201 acquires the position attitude information. The map information acquisition unit 203 acquires the map information. The measurement information acquisition unit 205 acquires the measurement information. The image feature amount acquisition unit 207 acquires the image feature amount.

The three-dimensional video generation device 20 accumulates the acquired various information (Step S3). In other words, the position attitude information acquisition unit 201 causes the position attitude information storage unit 202 to store the position attitude information. The map information acquisition unit 203 causes the map information storage unit 204 to store the map information. The measurement information acquisition unit 205 causes the measurement information storage unit 206 to store the measurement information. The image feature amount acquisition unit 207 causes the image feature amount storage unit 208 to store the image feature amount.

The three-dimensional video generation unit 210 identifies the position and attitude of the virtual camera provided in the virtual space associated with the real space, on the basis of the position attitude information (Step S4).

The three-dimensional video generation unit 210 generates the three-dimensional video of the virtual space in the imaging range of the virtual camera being at the identified position and attitude (Step S5).

The reprocessing determination unit 211 determines whether to perform reprocessing (Step S6). In other words, the reprocessing determination unit 211 re-estimates the position and attitude of the imaging device 10, and determines whether to regenerate the three-dimensional video based on the re-estimated position and attitude.

When it is determined not to perform the reprocessing (Step S6; No), the reprocessing determination unit 211 causes the three-dimensional video storage unit 214 to store the three-dimensional video generated by the three-dimensional video generation unit 210 (Step S7).

When it is determined to perform the reprocessing (Step S6; Yes), the position attitude re-estimation unit 212 regenerates the position attitude information of the imaging device 10, on the basis of the accumulated various information (Step S8).

The three-dimensional video regeneration unit 213 identifies the position and attitude of the virtual camera provided in the virtual space associated with the real space, on the basis of newly generated position attitude information (Step S9).

The three-dimensional video regeneration unit 213 regenerates the three-dimensional video of the virtual space in the imaging range of the virtual camera being at the identified position and attitude (Step S10).

The three-dimensional video regeneration unit 213 causes the three-dimensional video storage unit 214 to store the generated three-dimensional video (Step S11).

The three-dimensional video storage unit 214 transmits the stored three-dimensional video to the imaging device 10 and the three-dimensional video storage device 30 (Step S12).

Thus, the information processing system 1 finishes the three-dimensional video generation process.

As described above, in the information processing system 1 according to the first embodiment, the three-dimensional video generation device 20 accumulates the observation information obtained by observation of the surrounding environment by the imaging device 10. In other words, the three-dimensional video generation device 20 accumulates the image feature points that indicate the feature points of the second camera image captured by the second camera 12, the measurement information that is generated on the basis of the IMU information acquired by the inertial measurement unit 13, and the like. When the map information is updated by the optimization processing or the like, the three-dimensional video generation device 20 re-estimates the position of the imaging device 10, on the basis of the map information after the update and the accumulated observation information. Furthermore, the three-dimensional video generation device 20 identifies the position of the virtual camera in the virtual space, on the basis of the re-estimated position of the imaging device 10. Then, the three-dimensional video generation device 20 performs reprocessing to generate the three-dimensional video of the virtual space corresponding to the imaging range of the virtual camera at the identified position. As described above, when the map information is generated, the three-dimensional video generation device 20 generates the three-dimensional video according to the map information after the update. Therefore, when the map information is updated, the information processing system 1 generates the three-dimensional video according to the map information after the update, and thus, it is possible to eliminate the problem due to the error.

(First Modification of First Embodiment)

The reprocessing determination unit 211 according to a first modification of the first embodiment determines whether to perform reprocessing depending on whether a difference between the map information before the update and the map information after the update is equal to or larger than a threshold.

The reprocessing determination unit 211 makes a determination, on the basis of whether the difference between the map information before the update and the map information after the update is equal to or larger than the threshold. More specifically, the reprocessing determination unit 211 makes a determination on the basis of whether the sum of a difference in position of the imaging device 10 corresponding to an image, which is a component element of the map information, and a difference in position of a three-dimensional point group included in the image is equal to or larger than the threshold, between the map information before the update and the map information after the update.

Here, the map information includes a plurality of three-dimensional images that shows three-dimensional real spaces. The reprocessing determination unit 211 calculates the sum of a difference in the position attitude information of the imaging device 10 between the captured three-dimensional images captured, included in the map information, and a difference in the position of the three-dimensional point group between the three-dimensional images. Then, the reprocessing determination unit 211 determines whether the sum of the differences is equal to or larger than the threshold. In this way, the reprocessing determination unit 211 determines whether to perform reprocessing.

Figure 6:
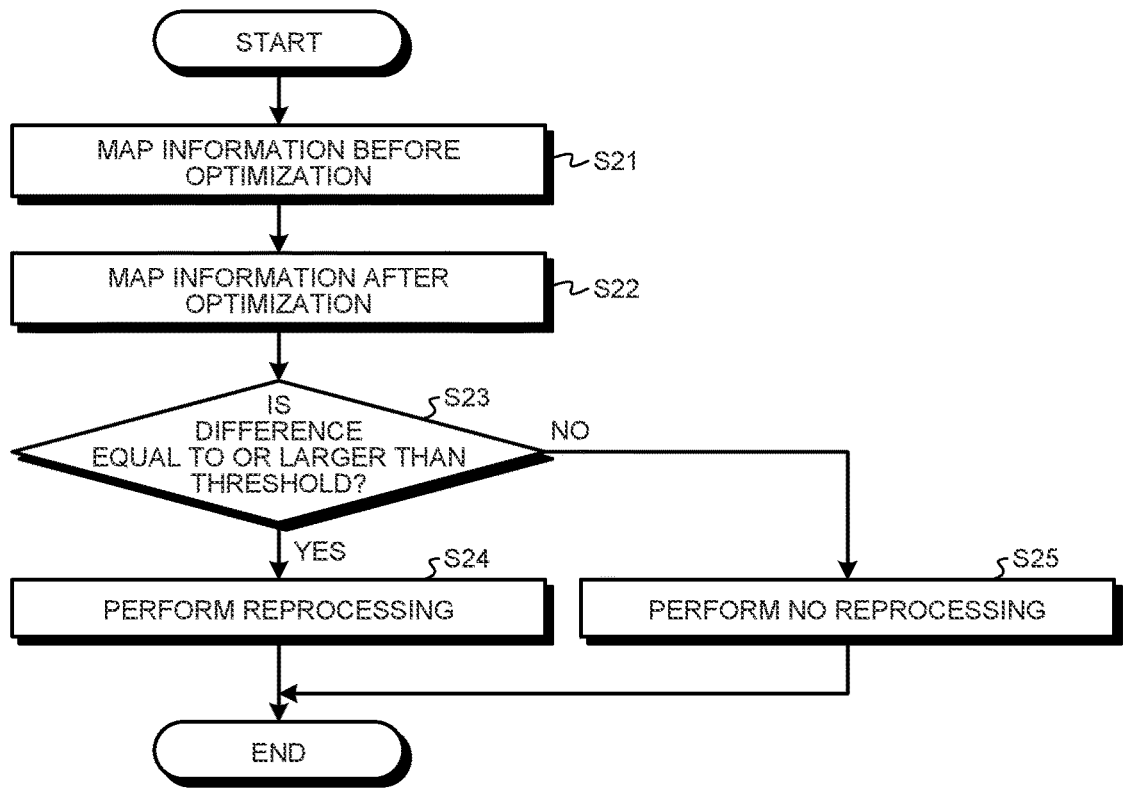
FIG. 6 is a flowchart illustrating an example of reprocessing determination according to a first modification of the first embodiment of the present disclosure.

Next, reprocessing determination performed by an information processing system 1a according to the first modification of the first embodiment will be described. FIG. 6 is a flowchart illustrating an example of the reprocessing determination according to the first modification of the first embodiment of the present disclosure.

The map information acquisition unit 203 acquires the map information (Step S21). In addition, the map information acquisition unit 203 causes the map information storage unit 204 to store the acquired map information.

The map information acquisition unit 203 acquires the map information after the update (Step S22). In addition, the map information acquisition unit 203 causes the map information storage unit 204 to store the map information after the update.

The reprocessing determination unit 211 determines whether a difference between the map information before the update and the map information after the update is equal to or larger than the threshold (Step S23). In a case where the difference between the map information before the update and the map information after the update is equal to or larger than the threshold (Step S23; Yes), the reprocessing determination unit 211 determines to perform the reprocessing (Step S24).

In a case where the difference between the map information before the update and the map information after the update is less than the threshold (Step S23; No), the reprocessing determination unit 211 determines not to perform reprocessing (Step S25).

As described above, the information processing system 1a finishes the reprocessing determination.

As described above, in the information processing system 1a according to the first modification of the first embodiment, a three-dimensional video generation device 20a includes the reprocessing determination unit 211 that determines whether to estimate the position of the imaging device 10 on the basis of the map information after the update. Therefore, the three-dimensional video generation device 20a is allowed to appropriately determine whether to perform the reprocessing.

(Second Modification of First Embodiment)

The reprocessing determination unit 211 according to a second modification of the first embodiment determines whether to perform reprocessing, depending on whether a difference between the position attitude information before the update and the position attitude information after the update is equal to or larger than a threshold.

The reprocessing determination unit 211 makes a determination on the basis of the degree of a change in the position attitude information estimated based on the map information before the update and the map information after the update. More specifically, the reprocessing determination unit 211 calculates differences in the position and attitude of the imaging device 10 indicated by the position attitude information generated on the basis of the map information before the update and the position attitude information generated on the basis of the map information after the update. Furthermore, the reprocessing determination unit 211 determines whether that the difference is equal to or larger than the threshold.

When the difference is equal to or larger than the threshold, the reprocessing determination unit 211 determines to perform reprocessing. In other words, when update of the map information causes a large change in the position and the attitude, the reprocessing determination unit 211 determines to perform the reprocessing. On the other hand, when the difference is less than the threshold, the reprocessing determination unit 211 determines not to perform the reprocessing.

Figure 7:
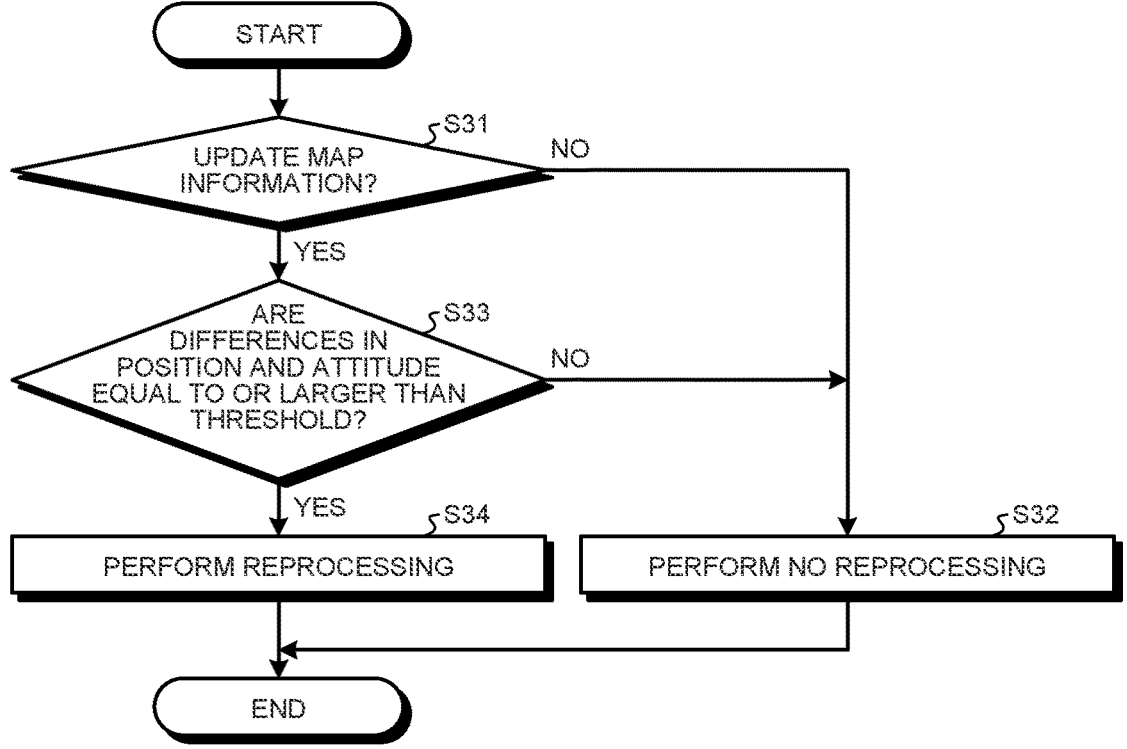
FIG. 7 is a flowchart illustrating an example of reprocessing determination according to a second modification of the first embodiment of the present disclosure.

Next, reprocessing determination performed by an information processing system 1b according to the first embodiment will be described. FIG. 7 is a flowchart illustrating an example of reprocessing determination according to the second modification of the first embodiment of the present disclosure.

The reprocessing determination unit 211 determines whether the map information has been updated by optimization processing or the like (Step S31). For example, the reprocessing determination unit 211 makes a comparison in the map information stored in the map information storage unit 204 to determine whether the map information has been updated. Note that the update determination method is not limited thereto, and the reprocessing determination unit 211 may determine the update of the map information by acquiring a flag indicating whether the map generation unit 122 has updated the map information, from the imaging device 10, or may determine whether the map information has been updated by another method.

When the map information has not been updated (Step S31; No), the reprocessing determination unit 211 does not need to perform the reprocessing, and determines not to perform the reprocessing (Step S32).

When the map information has been updated (Step S31; Yes), the reprocessing determination unit 211 determines whether differences in the position and attitude of the imaging device 10 indicated by the position attitude information are equal to or larger than a threshold (Step S33). Specifically, the reprocessing determination unit 211 compares the position attitude information generated on the basis of the map information immediately before update with the position attitude information generated on the basis of the map information immediately after the update, and determines whether the differences in the position and attitude of the imaging device 10 are equal to or larger than the threshold.

When the differences in the position and attitude of the imaging device 10 are less than the threshold (Step S33; No), the reprocessing determination unit 211 proceeds to Step S32 and determines not to perform the reprocessing.

When the differences in the position and attitude of the imaging device 10 are equal to or larger than the threshold (Step S33; Yes), the reprocessing determination unit 211 determines to perform reprocessing (Step S34).

As described above, the information processing system 1b finishes the reprocessing determination.

As described above, in the information processing system 1b according to the second modification of the first embodiment, a three-dimensional video generation device 20b determines the necessity of the reprocessing on the basis of the degree of a change in the position attitude information estimated on the basis of the map information before the update and the map information after the update. Therefore, the three-dimensional video generation device 20b is allowed to appropriately determine whether to perform the reprocessing.

Second Embodiment

A three-dimensional video generation device 20c according to a second embodiment is different from that of the first embodiment in that a position attitude correction unit 215 is included.

In the first embodiment, it is assumed that the camera operator takes a video of a desired imaging target by moving along the predetermined route. In the second embodiment, assuming that the camera operator moves on the basis of the three-dimensional video of the virtual space displayed on the display 15.

Here, the camera operator confirms the three-dimensional video of the virtual space on the display 15. Therefore, the camera operator can generate a desired three-dimensional video. However, there is a high possibility that the map information not optimized may include an error. Therefore, the three-dimensional video generated on the basis of the map information not optimized may provide a longer distance movement and a video taken for a longer time than those of the original plan. Alternatively, the three-dimensional video generated on the basis of the map information not optimized may provide a shorter distance movement and a video taken for a shorter time than those of the original plan. Accordingly, the generated three-dimensional video includes the desired imaging target, but has a time duration that is longer than the originally planned time duration or is shorter than the planned time duration, in some cases.

Therefore, the three-dimensional video generation device 20c according to the second embodiment includes the position attitude correction unit 215 that corrects the position attitude information. Here, the three-dimensional video regeneration unit 213 generates the three-dimensional video for each position indicated by the position attitude information corrected by the position attitude correction unit 215 to generate the three-dimensional video of the virtual space. Therefore, the position attitude correction unit 215 corrects the position attitude information, and decimates or adds the position and attitude of the imaging device 10. Thus, the three-dimensional video regeneration unit 213 is allowed to generate the three-dimensional video suitable for a desired time duration.

Figure 8:
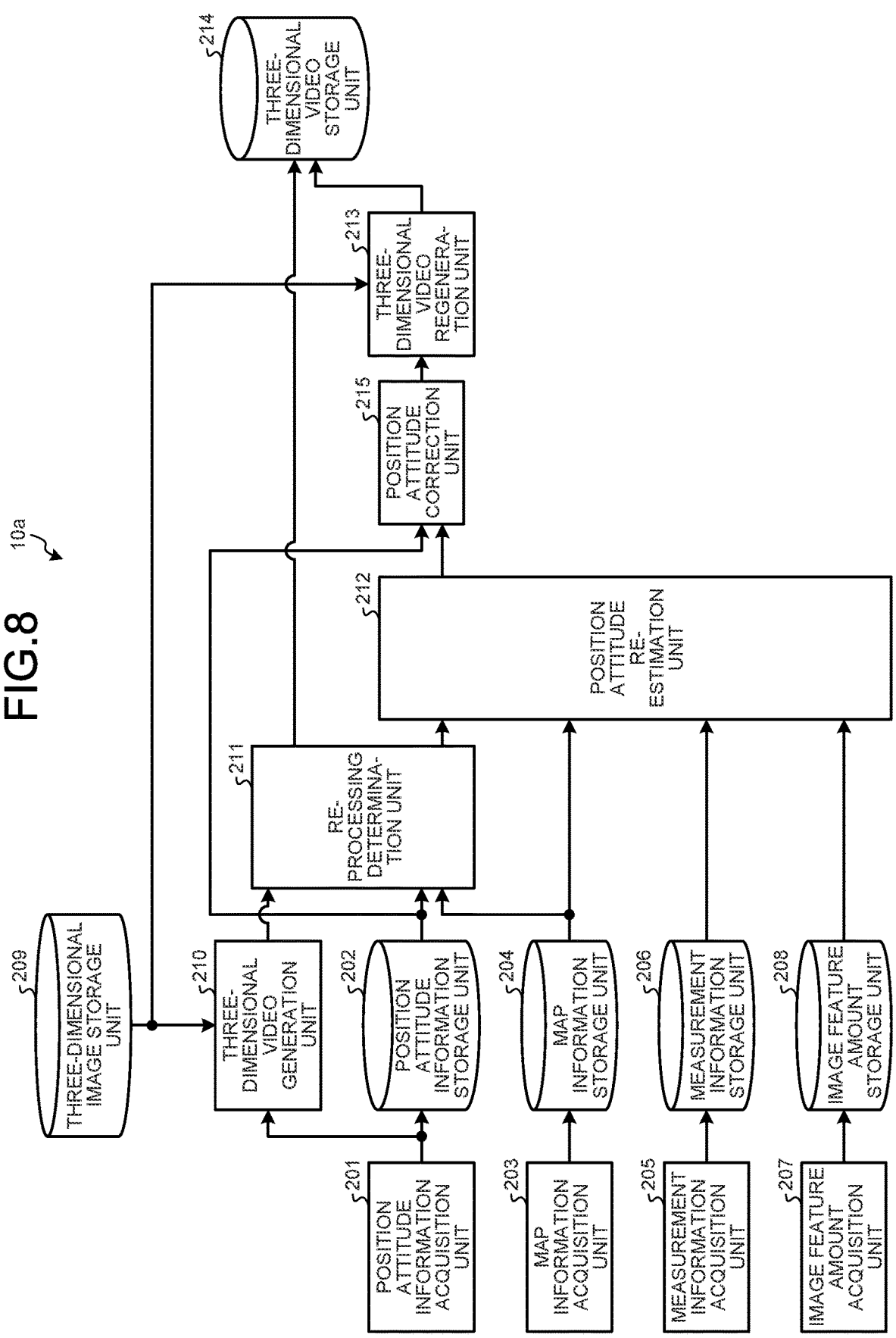
FIG. 8 is a diagram illustrating an example of a schematic configuration example of a three-dimensional video composition device according to a second embodiment of the present disclosure.

Here, FIG. 8 is a diagram illustrating an example of a schematic configuration of the three-dimensional video generation device 20c according to the second embodiment of the present disclosure. The three-dimensional video generation device 20c according to the second embodiment is different from the three-dimensional video generation device 20 according to the first embodiment in that the position attitude correction unit 215 is included.

The position attitude correction unit 215 corrects the position of the virtual camera when the map information indicating the map of the environment around the imaging device 10 is updated. Here, the position attitude re-estimation unit 212 re-estimates the position and attitude of the imaging device 10. Then, the position and attitude of the virtual camera are identified on the basis of the position and attitude of the imaging device 10. Therefore, the position attitude correction unit 215 is allowed to correct the position and attitude of the virtual camera by correcting the position and attitude of the imaging device 10.

More specifically, the position attitude correction unit 215 acquires a video duration indicating the duration of the three-dimensional video. For example, the position attitude correction unit 215 receives an input indicating an original moving route of the imaging device 10. Furthermore, the position attitude correction unit 215 calculates the moving speed of the camera operator on the basis of the position attitude information stored in the position attitude information storage unit 202. Then, the position attitude correction unit 215 calculates the video duration on the basis of the original moving route and the moving speed of the imaging device 10. Note that the position attitude correction unit 215 may receive an input specifying the video duration, in addition to the original moving route of the imaging device 10.

Furthermore, the position attitude correction unit 215 corrects the position of the virtual camera on the basis of the video duration. In other words, the position attitude correction unit 215 performs correction to add or omit the position of the virtual camera so as to match the video duration calculated by the position attitude correction unit 215. The position attitude correction unit 215 decimates or adds the position attitude information so as to match a time for imaging originally required. In the case where the position attitude information is decimated, the position attitude correction unit 215 may decimate the position attitude information at regular intervals, may decimate the position attitude information designated by the camera operator or the like, or may decimate the position attitude information specified by another method. Furthermore, in a case where the position attitude information is added, the position attitude correction unit 215 may add, for example, intermediate position attitude information between the previous and next position attitude information, position attitude information designated by the camera operator or the like, or position attitude information specified by another method.

The three-dimensional video regeneration unit 213 generates the three-dimensional video of the virtual space corresponding to the imaging range of the virtual camera located at a position corrected by the position attitude correction unit 215. More specifically, the three-dimensional video regeneration unit 213 generates the three-dimensional video of the virtual space corresponding to the imaging range of the virtual camera, for each position and attitude of the virtual camera corrected by the position attitude correction unit 215.

As described above, in an information processing system 1c according to the second embodiment, the three-dimensional video generation device 20c includes the position attitude correction unit 215 that corrects the position of the virtual camera when the map information indicating the map of the environment around the imaging device 10 is updated. Furthermore, the position attitude correction unit 215 corrects the position attitude information on the basis of the video duration to correct the position of the virtual camera. Then, the three-dimensional video regeneration unit 213 generates the three-dimensional video corresponding to the imaging range of the virtual camera, for each corrected position of the virtual camera. As described above, when the map information is updated, the three-dimensional video generation device 20c corrects the position of the virtual camera to generate the three-dimensional video, and thus, it is possible to solve the problem due to the error.

(First Modification of Second Embodiment)

In the second embodiment, the video duration is changed by decimation or addition of the position attitude information. In a first modification, the position attitude information is corrected to change the position of the video.

As illustrated in FIG. 1, when the map information is updated, the imaging position of the virtual camera changes. Then, even when the map information is updated and the imaging position is changed, a three-dimensional video generation device 20d generates a discontinuous three-dimensional video, if imaging is continued. Therefore, the position attitude correction unit 215 is configured to prevent the generation of the discontinuous three-dimensional video by stepwisely correcting the position indicated by the position attitude information.

The position attitude correction unit 215 corrects the position of the virtual camera on the basis of a position before the update indicating the position of the imaging device 10 estimated on the basis of the map information before the update and a position after the update indicating the position of the imaging device 10 estimated on the basis of the map information after the update. In other words, the position attitude correction unit 215 combines the position after the update and the position after the update to correct the position of the virtual camera. More specifically, the position attitude correction unit 215 generates the position attitude information that is obtained by combining the position attitude information generated on the basis of the map information before the update, and the position attitude information generated on the basis of the map information after the update. Then, the position attitude correction unit 215 stepwisely changes a combining ratio, upon combining the position attitude information.

Figure 9:
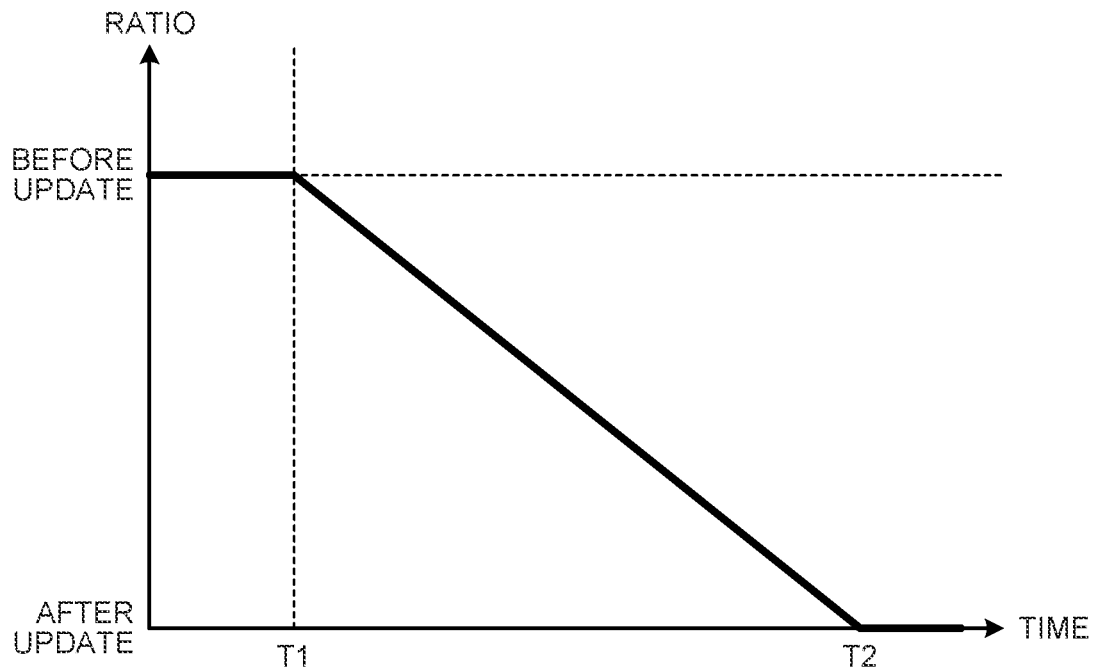
FIG. 9 is a graph illustrating an example of the content of processing according to a first modification of the second embodiment of the present disclosure.

Here, FIG. 9 is a graph illustrating an example of the content of processing according to the first modification of the second embodiment of the present disclosure. It is assumed that the ratio of the position attitude information generated on the basis of the map information before the update is 100% before the time T1. However, at the time T1, it is assumed that a difference between the position attitude information generated on the basis of the map information before the update and the position attitude information generated on the basis of the map information after the update is equal to or larger than a threshold.

In this case, the position attitude correction unit 215 generates the position attitude information that is obtained by combining the position attitude information generated on the basis of the map information before the update, and the position attitude information generated on the basis of the map information after the update. Furthermore, the position attitude correction unit 215 performs combining at a ratio that may stepwisely increase the ratio of the position after the update in combining the position after the update and the position after the update. Thereby the position of the virtual camera is corrected. In other words, the position attitude correction unit 215 generates the position attitude information in which the ratio of the position attitude information generated on the basis of the map information after the update is increased, in a period from the time T1 and the time T2. Then, the position attitude correction unit 215 increases the ratio of the position attitude information generated on the basis of the map information after the update to 100%. Therefore, the position attitude correction unit 215 prevents the generation of the discontinuous three-dimensional video.

As described above, in an information processing system 1*d* according to the first modification of the second embodiment, the three-dimensional video generation device 20*d* corrects the position of the virtual camera on the basis of the map information before the update and the map information after the update. In other words, the three-dimensional video generation device 20*d* combines the positions of the virtual camera before and after the update to correct the position of the virtual camera. Therefore, the three-dimensional video generation device 20*d* is allowed to solve the problem caused by the error in the map information.

(Second Modification of Second Embodiment)

In the first modification of the second embodiment, when between the position attitude information generated on the basis of the map information before the update and the position attitude information generated on the basis of the map information after the update is equal to or larger than the threshold, combining the position attitude information is started.

However, in the three-dimensional video, when combining the position attitude information is started before or while a scene includes the imaging target, generation of the video that the camera operator originally desires to take is prevented. Therefore, in a second modification of the second embodiment, an input of time point specification is received. In the time point specification, a time point is specified at which the start of the combining of the position attitude information generated on the basis of the map information before the update with the position attitude information generated on the basis of the map information after the update.

Figure 10:
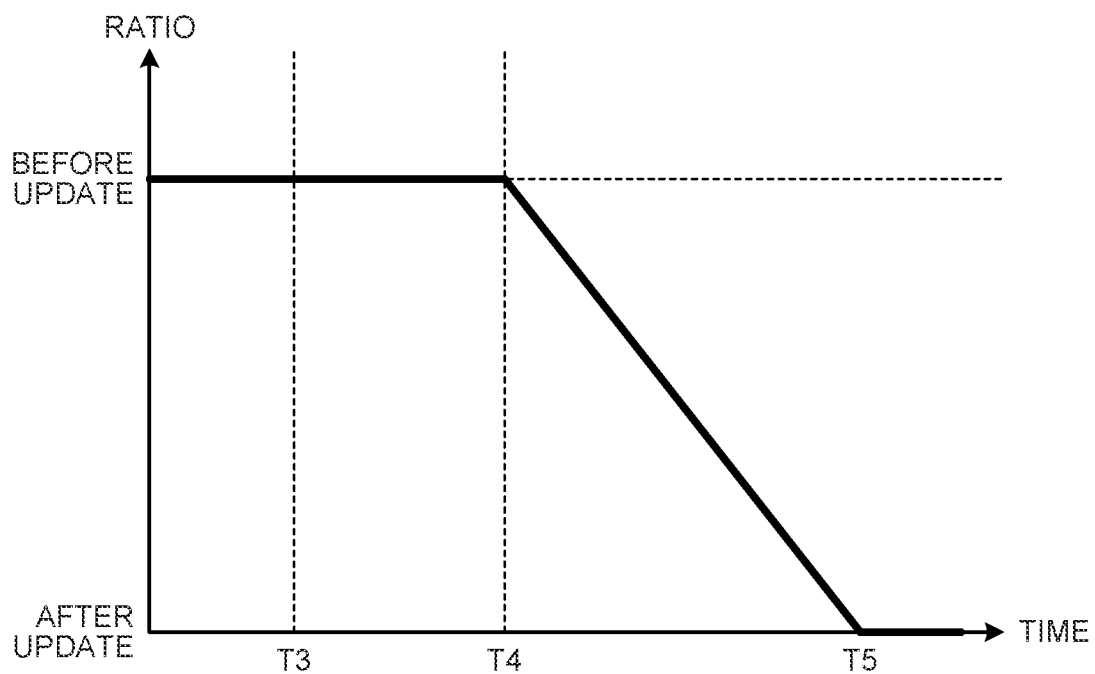
FIG. 10 is a graph illustrating an example of the content of processing according to a second modification of the second embodiment of the present disclosure.

Here, FIG. 10 is a graph illustrating an example of the content of processing according to the second modification of the second embodiment of the present disclosure. It is assumed that the ratio of the position attitude information generated on the basis of the map information before the update is 100% before the time T3. However, at time T3, it is assumed that a difference between the position attitude information generated on the basis of the map information before the update and the position attitude information generated on the basis of the map information after the update is equal to or larger than the threshold.

However, the imaging target, the video of which is taken by the camera operator, is included in the three-dimensional video until time T3. Therefore, the position attitude correction unit 215 receives an input of start point specification. In the start point specification, a start point is specified at which the correction is started in the moving route identified according to the position of the imaging device 10 indicated by the position attitude information accumulated in the position attitude information storage unit 202. Here, the start point may be information indicating the time to start the correction, information indicating a position to start the correction, or other information.

The position attitude correction unit 215 starts the correction of the position of the virtual camera, from the start point from which the correction of the position of the virtual camera is to be started. In other words, in FIG. 10, the position attitude correction unit 215 receives an input of specification of the time T4 as the start point. Then, the position attitude correction unit 215 generates the position attitude information in which the ratio of the position attitude information generated on the basis of the map information after the update is increased, in a period from the time T4 to the time T5.

As described above, in an information processing system 1*e* according to the second modification of the second embodiment, a three-dimensional video generation device 20*e* is configured to start to combine the position of the virtual camera from the specified start point and correct the position of the virtual camera while leaving the three-dimensional video at the start point. Therefore, the three-dimensional video generation device 20*e* is allowed to solve the problem caused by the error in the map information.

Figure 11:
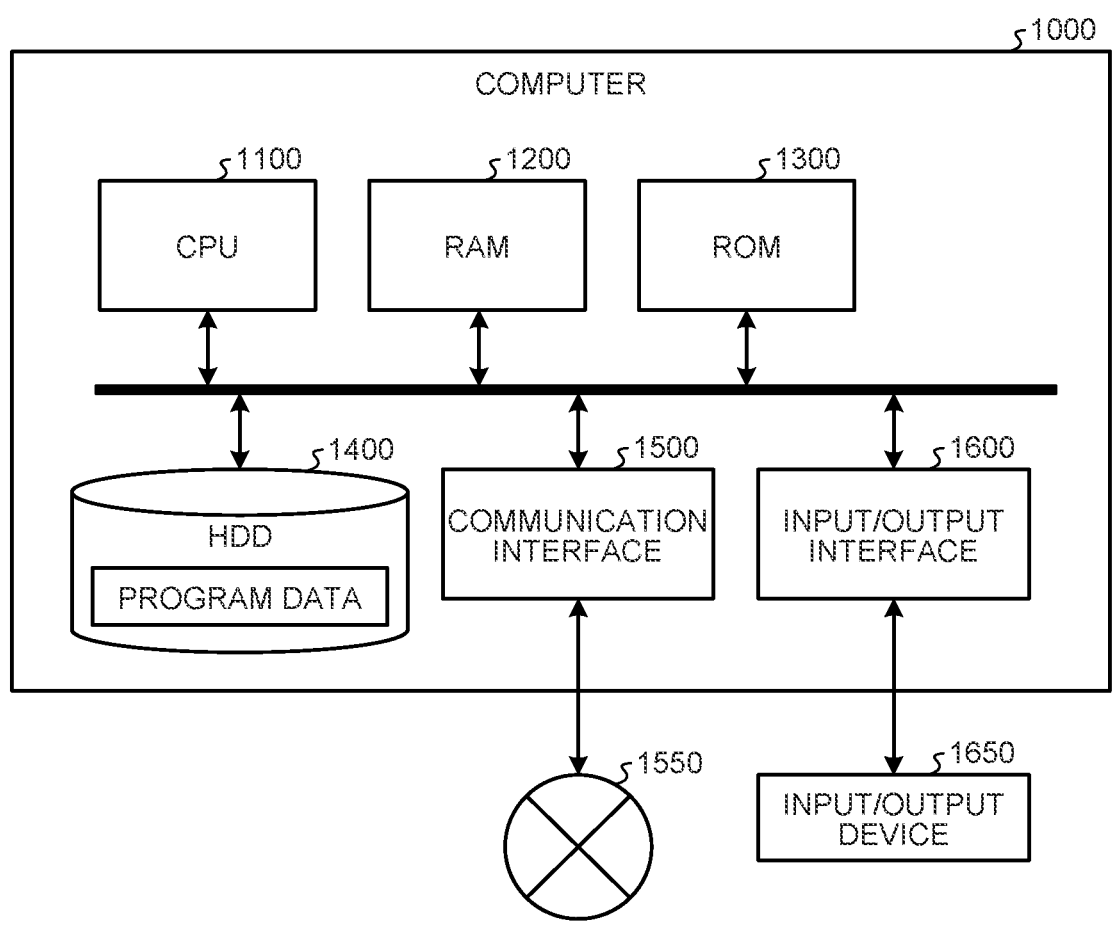
FIG. 11 is a block diagram illustrating a hardware configuration of a computer according to an embodiment of the present disclosure.

The imaging device 10, the three-dimensional video generation devices 20, 20*a*, 20*b*, 20*c*, 20*d*, and 20*e*, and the three-dimensional video storage device 30 that implement the information processing systems 1, 1*a*, 1*b*, 1*c*, 1*d*, and 1*e* according to the embodiments described above are implemented by, for example, a computer 1000 having a configuration as illustrated in FIG. 11. FIG. 11 is a block diagram illustrating a hardware configuration of the computer according to an embodiment of the present disclosure.

As illustrated in FIG. 11, the computer 1000 includes a CPU 1100, a RAM 1200, a read only memory (ROM) 1300, a hard disk drive (HDD) 1400, a communication interface 1500, and an input/output interface 1600. The component units of the computer 1000 are connected by a bus 1050.

The CPU 1100 is operated on the basis of a program stored in the ROM 1300 or the HDD 1400 and controls each component unit. For example, the CPU 1100 deploys the programs stored in the ROM 1300 or the HDD 1400 to the RAM 1200 and executes processing corresponding to various programs.

The ROM 1300 stores a boot program such as a basic input output system (BIOS) executed by the CPU 1100 when the computer 1000 is booted, a program depending on the hardware of the computer 1000, and the like.

The HDD 1400 is a computer-readable recording medium that non-transitorily records the programs executed by the CPU 1100, data used by the programs, and the like. Specifically, the HDD 1400 is a recording medium that records an image processing program according to the present disclosure, the image processing program being an example of program data 1450.

The communication interface 1500 is an interface for connecting the computer 1000 to an external network 1550 (e.g., the Internet). For example, the CPU 1100 receives data from another device or transmits data generated by the CPU 1100 to another device, via the communication interface 1500.

The input/output interface 1600 is an interface for connecting an input/output device 1650 and the computer 1000. For example, the CPU 1100 receives data from an input device such as a keyboard or mouse via the input/output interface 1600. In addition, the CPU 1100 transmits data to an output device such as a display, speaker, or printer via the input/output interface 1600. Furthermore, the input/output interface 1600 may function as a media interface that reads a program or the like recorded on a predetermined recording medium. The medium includes, for example, an optical recording medium such as a digital versatile disc (DVD) and phase change rewritable disk (PD), a magneto-optical recording medium such as a magneto-optical disk (MO), a tape medium, a magnetic recording medium, a semiconductor memory, or the like.

For example, when the computer 1000 functions as a server according to an embodiment described above, the CPU 1100 of the computer 1000 executes a program loaded on the RAM 1200 to implement at least one of the functions of the component units described above. In addition, the HDD 1400 stores the programs according to the present disclosure or data stored in at least one of the storage units described above. Note that the CPU 1100 executes the program data 1450 read from the HDD 1400, but in another example, the CPU 1100 may acquire programs from another device via the external network 1550.

Although the embodiments of the present disclosure have been described above, the technical scope of the present disclosure is not limited to the embodiments described above and various changes can be made without departing from the spirit and scope of the present disclosure. Moreover, the component elements of different embodiments and modifications may be suitably combined with each other.

Furthermore, the effects in the embodiments described herein are merely examples, the present invention is not limited to these effects, and other effects may also be provided.

Furthermore, each of the embodiments described above may be used alone, or may be used in combination with another embodiment.

(Effects)

The information processing systems 1, 1*a*, 1*b*, 1*c*, 1*d*, and 1*e* each include the position attitude re-estimation unit 212, the three-dimensional video regeneration unit 213, and the three-dimensional video regeneration unit 213. When the map information indicating the map of the environment around the imaging device 10 in the real space is updated, the position attitude re-estimation unit 212 estimates the position of the imaging device 10 on the basis of the observation information obtained by observing the environment around the imaging device 10 and the map information after the update. The three-dimensional video regeneration unit 213 identifies the position of the virtual camera provided in the virtual space associated with the real space, on the basis of the position of the imaging device 10 estimated by the position attitude re-estimation unit 212. The three-dimensional video regeneration unit 213 generates the three-dimensional video of the virtual space corresponding to the imaging range of the virtual camera located at the position identified by the three-dimensional video regeneration unit 213. Therefore, the information processing systems 1, 1*a*, 1*b*, 1*c*, 1*d*, and 1*e* are each configured to generate the three-dimensional video, even when the map information is updated by the optimization processing or the like.

The three-dimensional video regeneration unit 213 identifies the trajectory in the virtual space where the virtual camera has moved, on the basis of the position of the imaging device 10 estimated by the position attitude re-estimation unit 212. The three-dimensional video regeneration unit 213 generates the three-dimensional video of the virtual space corresponding to the imaging range of the virtual camera moving along the trajectory identified by the three-dimensional video regeneration unit 213. This configuration makes it possible for the information processing systems 1, 1*a*, 1*b*, 1*c*, 1*d*, and 1*e* to generate a continuous video even when an instruction for the movement of the virtual camera is given by the imaging device 10.

A reprocessing determination unit 211 determines whether to cause a position attitude re-estimation unit 212 to estimate the position of the imaging device 10, on the basis of the map information after the update. Here, application of a minor update to the map information does not require to re-estimate the position and attitude of the virtual camera to generate the three-dimensional video according to the position and attitude estimated, in some cases. The reprocessing determination unit 211 enables each of the information processing systems 1, 1*a*, 1*b*, 1*c*, 1*d*, and 1*e* to appropriately determine whether to perform processing again.

The reprocessing determination unit 211 makes a determination on the basis of the flag indicating whether the map information has been updated. Therefore, the reprocessing determination unit 211 enables the information processing system 1 to appropriately determine whether to perform processing again.

The reprocessing determination unit 211 makes a determination on the basis of the degree of a change in the position attitude information estimated on the basis of the map information before the update and the map information after the update. Therefore, the reprocessing determination unit 211 enables the information processing system 1 to appropriately determine whether to perform the processing again.

The reprocessing determination unit 211 makes a determination on the basis of whether a difference between the map information before the update and the map information after the update is equal to or larger than the threshold. Therefore, the reprocessing determination unit 211 enables the information processing system 1a to appropriately determine whether to perform the processing again.

The reprocessing determination unit 211 makes a determination on the basis of whether the sum of a difference in position of the imaging device 10 corresponding to an image, which is a component element of the map information, and a difference in position of a three-dimensional point group included in the image is equal to or larger than the threshold, between the map information before the update and the map information after the update. Therefore, the reprocessing determination unit 211 enables the information processing system 1a to appropriately determine whether to perform the processing again.

The three-dimensional video storage unit 214 outputs the three-dimensional video of the virtual space corresponding to the imaging range of the virtual camera. As a result, the information processing system 1 causes the display 15 of the imaging device 10 to display the three-dimensional video of the virtual camera. Therefore, the camera operator can move while confirming the three-dimensional video of the virtual space.

The position attitude correction unit 215 corrects the position of the virtual camera when the map information indicating the map of the environment around the imaging device 10 is updated. The three-dimensional video regeneration unit 213 generates the three-dimensional video of the virtual space corresponding to the imaging range of the virtual camera located at a position corrected by the position attitude correction unit 215. Therefore, the information processing systems 1, 1a, 1b, 1c, 1d, and 1e are each allowed to correct the three-dimensional video.

The position attitude correction unit 215 corrects the position of the virtual camera on the basis of a position before the update indicating the position of the imaging device 10 estimated on the basis of the map information before the update and a position after the update indicating the position of the imaging device 10 estimated on the basis of the map information after the update. Therefore, when the discontinuous three-dimensional video is provided due to a change in the position of the virtual camera, the information processing systems 1d and 1e are each allowed to generate the continuous three-dimensional video by correcting the position of the virtual camera.

The position attitude correction unit 215 acquires the video duration indicating the duration of the three-dimensional video. The position attitude correction unit 215 corrects the position of the virtual camera on the basis of the video duration. Therefore, the information processing system 1c is allowed to correct the video duration of the three-dimensional video generated on the basis of the map information before the update, to the initially expected time, in a case where the video duration is different from the initially expected time.

The position attitude correction unit 215 calculates the video duration on the basis of the original moving route and the moving speed of the imaging device 10. The position attitude correction unit 215 performs correction to add or omit the position of the virtual camera so as to match the video duration calculated by the position attitude correction unit 215. The three-dimensional video regeneration unit 213 generates the three-dimensional video of the virtual space corresponding to the imaging range of the virtual camera, for each position of the virtual camera corrected by the position attitude correction unit 215. Therefore, the information processing system 1c is allowed to correct the video duration of the three-dimensional video generated on the basis of the map information before the update, to the initially expected time, in a case where the video duration is different from the initially expected time.

The position attitude correction unit 215 combines the position before the update and the position after the update to correct the position of the virtual camera. Therefore, the information processing systems 1d and 1e are each allowed to combine the positions of the virtual cameras before and after updating the map information to generate the continuous three-dimensional video.

The position attitude correction unit 215 performs combining at a ratio that may stepwise increase the ratio of the position after the update in combining the position before the update and the position after the update, and corrects the position of the virtual camera. Therefore, the information processing systems 1d and 1e are each allowed to stepwise combine the positions of the virtual cameras before and after the map information is updated, generating the continuous three-dimensional video.

The position attitude correction unit 215 starts the correction of the position of the virtual camera, from the start point from which the correction of the position of the virtual camera is to be started. Therefore, the information processing system 1e is allowed to generate the continuous three-dimensional video while leaving the three-dimensional video that the camera operator desires to leave.

Note that the effects described herein are merely examples, and the present invention is not limited to these effects and may have other effects.

Additionally, the present technology may also be configured as below.

(1)

An information processing system comprising:
an estimation unit that, when map information indicating a map of an environment around a first device in a real space is updated, estimates a position of the first device, based on observation information obtained by observing the environment around the first device and the map information after update;
an identification unit that identifies a position of a virtual camera provided in a virtual space associated with the real space, based on the position of the first device estimated by the estimation unit; and
a video generation unit that generates a video of the virtual space corresponding to an imaging range of the camera at the position identified by the identification unit.

(2)

The information processing system according to (1), wherein
the identification unit identifies a trajectory in the virtual space where the camera has moved, based on the position of the first device estimated by the estimation unit, and
the video generation unit generates the video of the virtual space corresponding to the imaging range of the camera having moved along the trajectory identified by the identification unit.

(3)

The information processing system according to (1) or (2), further comprising
  a determination unit that determines whether to cause the estimation unit to estimate the position of the first device based on the map information after update.

(4)

The information processing system according to (3), wherein
  the determination unit makes a determination based on a flag indicating whether the map information has been updated.

(5)

The information processing system according to (3), wherein
  the determination unit makes a determination based on a degree of a change in position attitude information estimated based on the map information before and after update.

(6)

The information processing system according to (3), wherein
  the determination unit makes a determination based on whether a difference between the map information before update and the map information after update is equal to or larger than a threshold.

(7)

The information processing system according to (6), wherein
  the determination unit makes a determination based on whether the sum of a difference in position of the first device corresponding to an image, which is a component element of the map information, and a difference in position of a three-dimensional point group included in the image is equal to or larger than a threshold, between the map information before the update and the map information after the update.

(8)

The information processing system according to any one of (1) to (7), further comprising
  an output unit that outputs the video of the virtual space corresponding to the imaging range of the camera.

(9)

The information processing system according to any one of (1) to (8), further comprising
  a correction unit that corrects the position of the camera when the map information indicating the map of the environment around the first device is updated,
  wherein the video generation unit generates the video of the virtual space corresponding to the imaging range of the camera at the position corrected by the correction unit.

(10)

The information processing system according to (9), wherein
  the correction unit corrects the position of the camera based on a position before update indicating the position of the first device estimated based on the map information before update and a position after the update indicating the position of the first device estimated based on the map information after update.

(11)

The information processing system according to (9), further comprising
  a time acquisition unit that acquires a video duration indicating a duration of a video,
  wherein the correction unit corrects the position of the camera based on the video duration.

(12)

The information processing system according to (11), wherein
  the time acquisition unit calculates the video duration based on a trajectory of actual movement of the first device and a moving speed,
  the correction unit performs correction to add or omit the position of the camera to match the video duration calculated by the time acquisition unit, and
  the video generation unit generates a video of the virtual space corresponding to the imaging range of the camera, for each position of the camera corrected by the correction unit.

(13)

The information processing system according to (10), wherein
  the correction unit combines the position before update and the position after update to correct the position of the camera.

(14)

The information processing system according to (13), wherein
  the correction unit performs combining at a ratio that may stepwisely increase the ratio of the position after update in combining the position before update and the position after update, and correct the position of the camera.

(15)

The information processing system according to (13) or (14), wherein
  the correction unit starts correction of the position of the camera, from a start point from which the correction of the position of the camera is to be started.

(16)

An information processing method comprising:
  when map information indicating a map of an environment around a first device in a real space is updated, estimating a position of the first device, based on observation information obtained by observing the environment around the first device and the map information after update;
  identifying a position of a virtual camera provided in a virtual space associated with the real space, based on the estimated position of the first device; and
  generating a video of the virtual space corresponding to an imaging range of the camera at the identified position.

(17)

A program for causing a computer to function as:
  an estimation unit that, when map information indicating a map of an environment around a first device in a real space is updated, estimates a position of the first device, based on observation information obtained by observing the environment around the first device and the map information after update;
  an identification unit that identifies a position of a virtual camera provided in a virtual space associated with the real space, based on the position of the first device estimated by the estimation unit; and
  a video generation unit that generates a video of the virtual space corresponding to an imaging range of the camera at the position identified by the identification unit.

REFERENCE SIGNS LIST 1, 1a, 1b, 1c, 1d, 1e INFORMATION PROCESSING SYSTEM
10 IMAGING DEVICE
12 SECOND CAMERA
13 INERTIAL MEASUREMENT UNIT
14 POSITION ATTITUDE ESTIMATION UNIT
15 DISPLAY
20, 20a, 20b, 20c, 20d, 20e THREE-DIMENSIONAL VIDEO GENERATION DEVICE
30 THREE-DIMENSIONAL VIDEO STORAGE DEVICE
152 DISPLAY CONTROL UNIT
201 POSITION ATTITUDE INFORMATION ACQUISITION UNIT
202 POSITION ATTITUDE INFORMATION STORAGE UNIT
203 MAP INFORMATION ACQUISITION UNIT
205 MEASUREMENT INFORMATION ACQUISITION UNIT
207 IMAGE FEATURE AMOUNT ACQUISITION UNIT
206 MEASUREMENT INFORMATION STORAGE UNIT
208 IMAGE FEATURE AMOUNT STORAGE UNIT
209 THREE-DIMENSIONAL IMAGE STORAGE UNIT
210 THREE-DIMENSIONAL VIDEO GENERATION UNIT
211 REPROCESSING DETERMINATION UNIT
212 POSITION ATTITUDE RE-ESTIMATION UNIT
214 THREE-DIMENSIONAL VIDEO STORAGE UNIT
213 THREE-DIMENSIONAL VIDEO REGENERATION UNIT
215 POSITION ATTITUDE CORRECTION UNIT

The invention claimed is:

1. An information processing system, comprising:
at least one processor configured to:
estimate, when map information indicating a map of an environment around a first device in a real space is updated, a position of the first device based on observation information obtained by observing the environment around the first device and the updated map information;
identify a position of a virtual camera, provided in a virtual space associated with the real space, based on the estimated position of the first device; and
generate a video of the virtual space corresponding to an imaging range of the virtual camera at the identified position of the virtual camera.

2. The information processing system according to claim 1, wherein the at least one processor is further configured to:
identify a trajectory in the virtual space where the virtual camera has moved, based on the estimated position of the first device; and
generate the video of the virtual space corresponding to the imaging range of the virtual camera having moved along the identified trajectory.

3. The information processing system according to claim 1, the at least one processor is further configured to determine whether to estimate the position of the first device based on the updated map information.

4. The information processing system according to claim 3, wherein the at least one processor is further configured to determine whether to estimate the position of the first device based on a flag indicating whether the map information has been updated.

5. The information processing system according to claim 3, wherein the at least one processor is further configured to determine whether to estimate the position of the first device based on a degree of a change in position attitude information of the first device which is estimated based on the map information before and after the update.

6. The information processing system according to claim 3, wherein the at least one processor is further configured to determine whether to estimate the position of the first device based on whether a difference between the map information before the update and the map information after the update is equal to or larger than a threshold.

7. The information processing system according to claim 6, wherein the at least one processor is further configured to determine whether to estimate the position of the first device based on whether a sum of a difference in the position of the first device corresponding to an image, which is a component element of the map information, and a difference in the position of a three-dimensional point group included in the image is equal to or larger than the threshold, between the map information before the update and the map information after the update.

8. The information processing system according to claim 1, wherein the at least one processor is further configured to output the video of the virtual space corresponding to the imaging range of the virtual camera.

9. The information processing system according to claim 1, wherein the at least one processor is further configured to:
correct the position of the virtual camera when the map information is updated; and
generate the video of the virtual space corresponding to the imaging range of the virtual camera at the corrected position.

10. The information processing system according to claim 9, wherein the at least one processor is further configured to correct the position of the virtual camera based on
a first position before the update indicating the position of the first device estimated based on the map information before the update, and
a second position after the update indicating the position of the first device estimated based on the map information after the update.

11. The information processing system according to claim 10, wherein the at least one processor is further configured to combine the first position and the second position to correct the position of the virtual camera.

12. The information processing system according to claim 11, wherein the at least one processor is further configured to:
combine the first position and the second position at a ratio that stepwisely increase the ratio of the second position in the combination of the first position and the second position; and
correct the position of the virtual camera.

13. The information processing system according to claim 11, wherein the at least one processor is further configured to start the correction of the position of the virtual camera, from a specific start point from which the correction of the position of the virtual camera is to be started.

14. The information processing system according to claim 9, wherein the at least one processor is further configured to:
acquire a video duration indicating a duration of the video, and
correct the position of the virtual camera based on the video duration.

15. The information processing system according to claim 14, wherein the at least one processor is further configured to:

calculate the video duration based on a trajectory of movement of the first device and a moving speed of the first device;

perform correction to add or omit the position of the virtual camera to match the calculated video duration; and generate the video of the virtual space corresponding to the imaging range of the virtual camera, for each corrected position of the virtual camera.

16. An information processing method, comprising:

when map information indicating a map of an environment around a first device in a real space is updated, estimating, via a processor, a position of the first device, based on observation information obtained by observing the environment around the first device and the map information after the update;

identifying, via the processor, a position of a virtual camera, provided in a virtual space associated with the real space, based on the estimated position of the first device; and generating, via the processor, a video of the virtual space corresponding to an imaging range of the virtual camera at the identified position.

17. A non-transitory computer-readable medium having stored thereon, computer-executable instructions that when executed by a system, causes the system to execute operations, the operations comprising:

estimate, when map information indicating a map of an environment around a first device in a real space is updated, a position of the first device based on observation information obtained by observing the environment around the first device and the updated map information;

identify a position of a virtual camera, provided in a virtual space associated with the real space, based on the estimated position of the first device; and generate a video of the virtual space corresponding to an imaging range of the virtual camera at the identified position of the virtual camera.

18. An information processing system, comprising:

at least one processor configured to:

determine whether to estimate a position of a first device based on updated map information, wherein the map information indicates a map of an environment around the first device in a real space;

estimate, when map information is updated, the position of the first device based on observation information obtained by observing the environment around the first device and the updated map information;

identify a position of a virtual camera, provided in a virtual space associated with the real space, based on the estimated position of the first device; and generate a video of the virtual space corresponding to an imaging range of the virtual camera at the identified position of the virtual camera.

* * * * *